(12) United States Patent
Khosrowpour

(10) Patent No.: US 11,275,668 B2
(45) Date of Patent: Mar. 15, 2022

(54) DYNAMICALLY ENHANCING THE PERFORMANCE OF A FOREGROUND APPLICATION

(71) Applicant: Dell Products L.P., Round Rock, TX (US)

(72) Inventor: Farzad Khosrowpour, Pflugerville, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/989,558

(22) Filed: Aug. 10, 2020

(65) Prior Publication Data
US 2022/0043736 A1    Feb. 10, 2022

(51) Int. Cl.
| | |
|---|---|
| G06F 9/44 | (2018.01) |
| G06F 11/34 | (2006.01) |
| G06F 9/50 | (2006.01) |
| G06F 11/30 | (2006.01) |

(52) U.S. Cl.
CPC ........ *G06F 11/3466* (2013.01); *G06F 9/5027* (2013.01); *G06F 11/302* (2013.01); *G06F 11/3072* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 9,118,520 B1* | 8/2015 | Mao | G06F 11/3409 |
| 2008/0177994 A1* | 7/2008 | Mayer | G06F 9/4418 |
| | | | 714/E11.138 |
| 2011/0320529 A1* | 12/2011 | Mentchoukov | G06F 16/958 |
| | | | 709/203 |
| 2015/0254108 A1* | 9/2015 | Kurtzman | G06F 9/54 |
| | | | 718/104 |
| 2015/0277675 A1* | 10/2015 | Firestone | G06F 3/0482 |
| | | | 715/789 |
| 2017/0053129 A1* | 2/2017 | Arif | G06F 3/0482 |
| 2019/0045048 A1* | 2/2019 | Li | H04L 41/08 |
| 2019/0129753 A1* | 5/2019 | Chen | G06F 9/5011 |

* cited by examiner

*Primary Examiner* — Qamrun Nahar
(74) *Attorney, Agent, or Firm* — Kirton McConkie; Brian Tucker

(57) ABSTRACT

A performance enhancing solution can be executed on a computing device to detect changes in the foreground application. When the foreground application changes, the performance enhancing solution can adjust the allocation of system resources to running applications to thereby enhance the performance of the foreground application.

20 Claims, 5 Drawing Sheets

DYNAMICALLY ENHANCING THE PERFORMANCE OF A FOREGROUND APPLICATION

CROSS-REFERENCE TO RELATED APPLICATIONS

N/A

BACKGROUND

The performance and responsiveness of an application is largely dependent on the availability of system resources. For example, when multiple applications are concurrently executing, the applications will necessarily share the system resources. Some technologies exist for enhancing how system resources are allocated to running applications. For example, the operating system may provide a scheduler (e.g., the Windows Scheduler or the Linux Scheduler) that is configured to control when an application (or more particularly, an application's process or thread) is run based on a priority setting or other considerations. However, the functionality that such schedulers perform does not directly manage the availability of system resources for a particular application. Instead, this functionality is largely limited to performing time slot allocation and enforcing static priority settings or allocating all system resources equally while always prioritizing the foreground application over background applications.

BRIEF SUMMARY

The present invention extends to methods, systems, and computer program products for dynamically enhancing the performance of a foreground application. More particularly, embodiments of the present invention may be implemented to ensure that an application that is currently running in the foreground can be allocated sufficient system resources to enhance its performance even when other applications are running in the background. A performance enhancing solution can be executed on a computing device to detect changes in the foreground application. When the foreground application changes, the performance enhancing solution can adjust the allocation of system resources to running applications to thereby enhance the performance of the foreground application.

In some embodiments, the present invention may be implemented as a method for dynamically enhancing the performance of a foreground application. It can be detected that a first application of a plurality of running applications has become the foreground application and that the first application is a target application. In response to determining that the first application is a target application, an allocation of system resources to the plurality of running applications can be adjusted to enhance the performance of the first application while the first application is the foreground application.

In some embodiments, the present invention can be implemented as computer storage media storing computer executable instructions which when executed on a computing device implement a method for dynamically enhancing the performance of a foreground application. This method can include: monitoring for changes in the foreground application; upon detecting that the foreground application has changed, determining that the foreground application is a target application; and in response to determining that the foreground application is a target application, adjusting an allocation of system resources to a plurality of running applications to enhance the performance of the foreground application.

In some embodiments, the present invention may be implemented as a computing device that includes system resources, an operating system, a performance enhancing solution and a plurality of applications. The performance enhancing solution is configured to dynamically enhance the performance of at least one target application of the plurality of applications by adjusting an allocation of the system resources to the plurality of applications.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
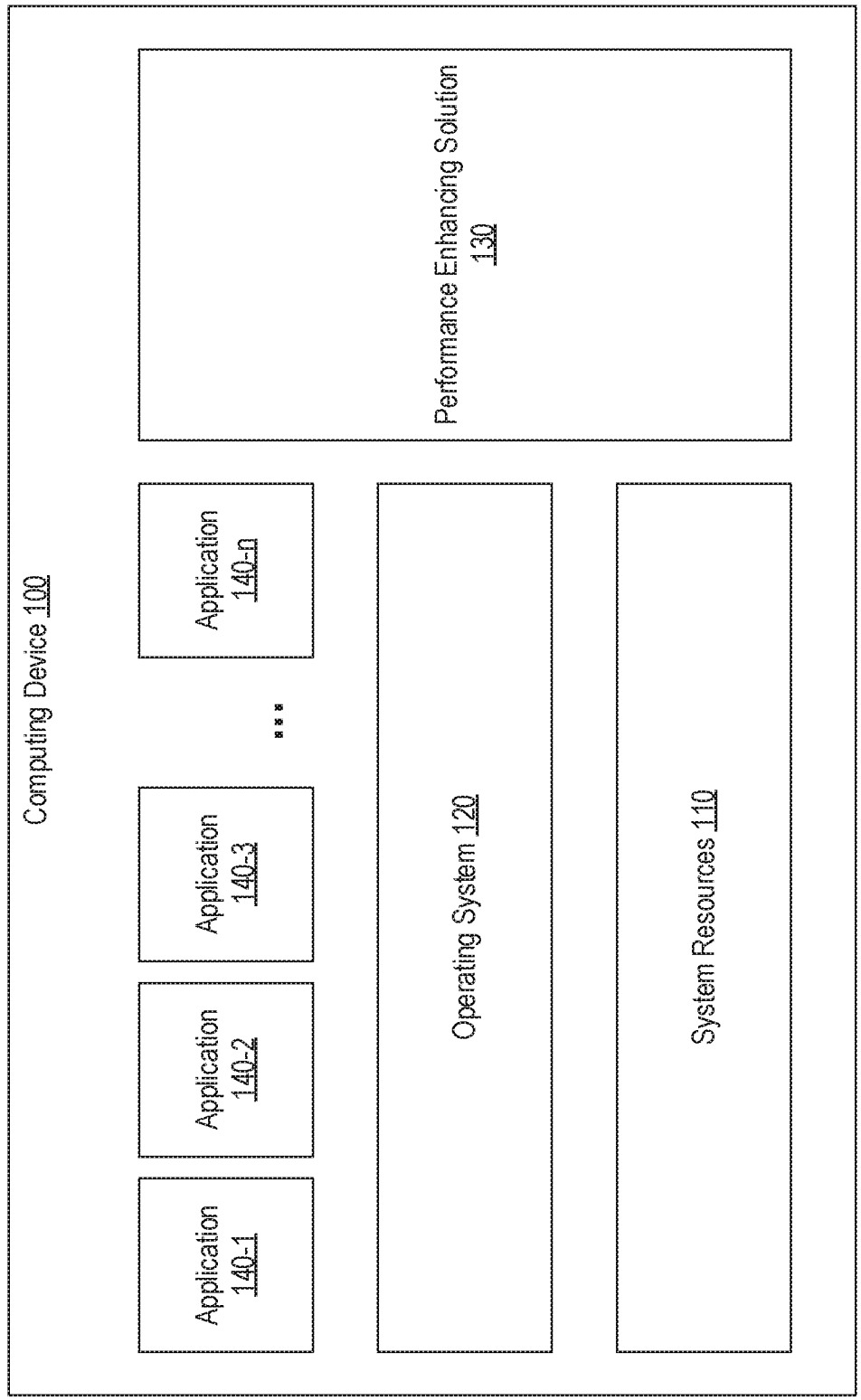
FIG. 1 illustrates an example computing environment in which embodiments of the present invention may be implemented.

FIG. 1 illustrates a computing device 100 and provides an example of components that may exist on computing device 100 when embodiments of the present invention are implemented. Computing device 100 can represent a desktop, laptop, server, thin client, smart phone or any other type of computing device that is capable of running applications. For example, computing device 100 is shown as having system resources 110 and an operating system 120 that controls how system resources 110 will be made available to any application that is executed on computing device 100. FIG. 1 further shows that a number of applications 140-1 through 140-$n$ (where n could represent any integer greater than 1) may be running on computing device at any given time, one of which could be the foreground application. Although embodiments of the present invention could be implemented when any number of applications are running concurrently, benefits of implementing the present invention will be enhanced when many applications are running concurrently. The term "foreground application" and its variants should be construed in accordance with its typical meaning. As an example, the foreground application may be viewed as the application that owns (or is associated with) the window that has focus.

System resources 110 can generally represent the various types of hardware and/or software resources that may be required to execute an application or that an application may employ during execution. For example, system resources 110 may include the central processing unit, memory, input/output (I/O) resources (including physical and virtual storage and network I/O stacks), etc. Although embodiments of the present invention will be described primarily using various Windows-specific examples, operating system 120 can represent any available operating system including Windows, Linux, Unix, iOS, Android, etc.

FIG. 1 also illustrates that a performance enhancing solution 130 can be employed on computing device 100 to implement embodiments of the present invention. Performance enhancing solution 130 can represent any suitable form of software that may be executed on computing device 100 to perform the functionality described herein. As examples only, performance enhancing solution 130 could be or could include a process, service, driver, etc. that may run in user mode, kernel mode or both. As an overview, performance enhancing solution 130 may be configured to interface with system resources 110, operating system 120 and/or applications 140-1 through 140-n to monitor which of applications 140-1 through 140-n may be running in the foreground and to dynamically adjust how operating system 120 allocates system resources 110 to at least some of applications 140-1 through 140-n in a manner that enhances the performance of the foreground application.

Figure 2:
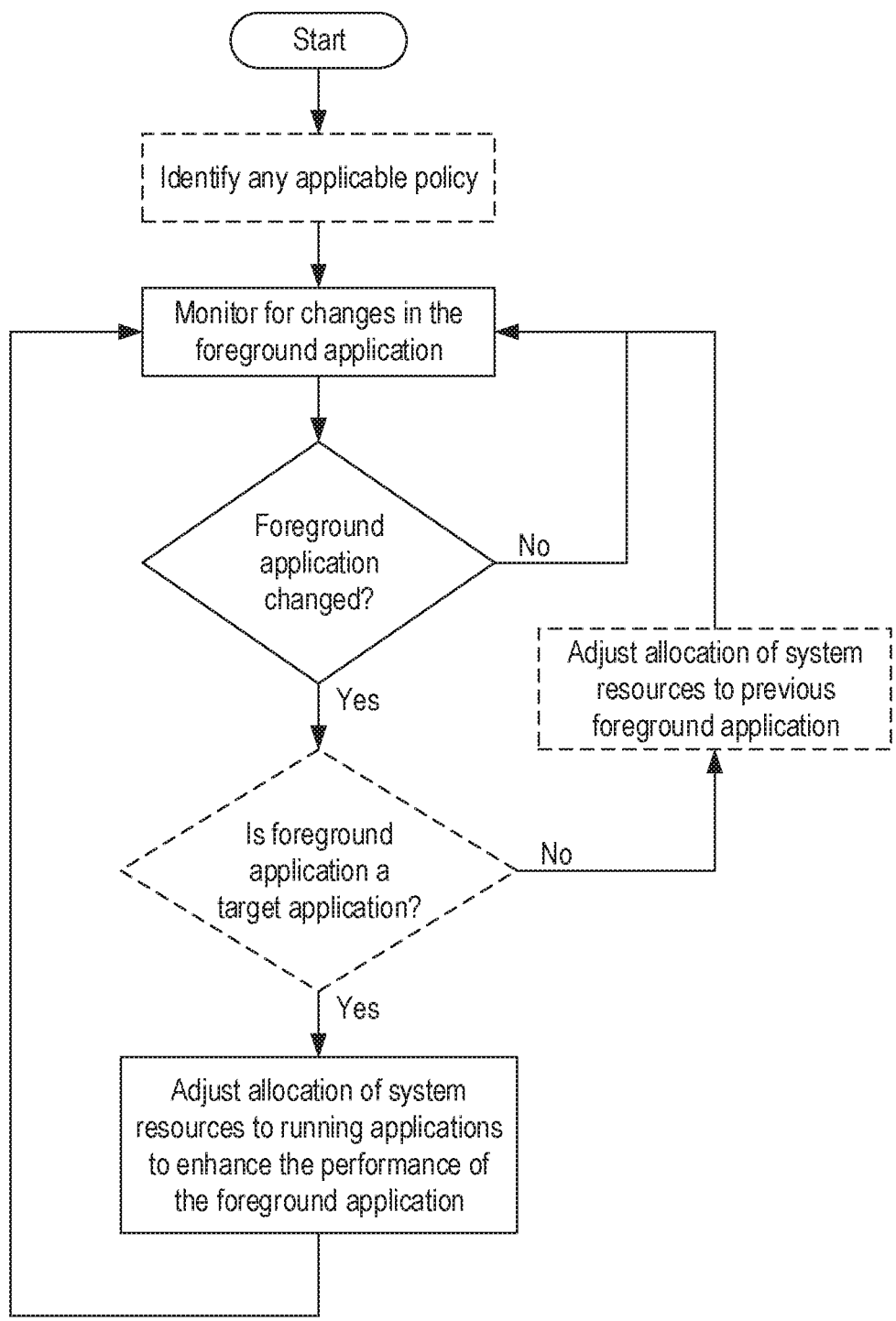
FIG. 2 is a flow diagram representing an example method for dynamically enhancing the performance of a foreground application.

FIG. 2 provides a flow diagram representing an example of how performance enhancing solution 130 may dynamically enhance the performance of a foreground application. As shown, when performance enhancing solution 130 is loaded, it may identify one or more applicable policies. This step is shown in dashed lines to represent that it is an optional step that may not be performed in all implementations of the present invention. For example, performance enhancing solution 130 may not rely on a policy in embodiments where it adjusts the allocation of system resources 110 in a similar manner regardless of which application is the foreground application. However, the use of policy may enable a wide range of customizations and dynamic adjustments. Various examples of how performance enhancing solution 130 may employ a policy are provided below.

While performance enhancing solution 130 executes concurrently with applications 140-1 through 140-n, it can monitor for changes in the foreground application. In other words, performance enhancing solution 130 can be configured to detect which application is running in the foreground at any particular time. Performance enhancing solution 130 could employ any suitable technique for determining the foreground application. For example, performance enhancing solution 130 could install a hook that causes operating system 120 to notify it whenever the foreground application changes (e.g. using the SetWindowsHookExA function to install a WH_CBT hook procedure that watches for HCBT_SETFOCUS notifications in a Windows-based implementation). As another example, performance enhancing solution 130 could periodically call a function provided by operating system 120 to obtain the foreground application (e.g., by calling the GetForegroundWindow function in Windows or by reading the _NET_ACTIVE_WINDOW property in Linux).

Regardless of the technique that performance enhancing solution 130 may employ to enable it to detect when the foreground application has changed, when it detects a change in the foreground application, performance enhancing solution 130 may determine whether the current foreground application is a "target application." This step is shown in dashed lines to represent that performance enhancing solution 130 need not always make this determination. In particular and as further described below, in some embodiments, performance enhancing solution 130 may always enhance the performance of the foreground application (i.e., it may always treat the foreground application as if it were a "target application") as opposed to enhancing the foreground application only when it is a target application.

In embodiments where performance enhancing solution 130 determines whether the foreground application is a target application, performance enhancing solution 130 may make the determination based on policy. For example, the user may be enabled to define a policy that lists each application that should be considered a target application. Alternatively or additionally, the user may be enabled to define a policy that causes performance enhancing solution 130 to select the most frequently used applications as target applications. In such cases, some of applications 140-1 through 140-n may be target applications while others may not be target applications (or "non-target applications").

If the foreground application is a target application (or if the performance of the foreground application is always enhanced), performance enhancing solution 130 may interface with operating system 120 to adjust the allocation of system resources 110 to one or more of applications 140-1 through 140-n to thereby enhance the performance of the foreground application. Performance enhancing solution 130 may employ a policy to determine how to adjust the allocation of system resources 110.

In addition to adjusting the allocation of system resources 110 when the current foreground application is a target application, in some instances, performance enhancing solution 130 may also adjust the allocation of system resources 110 when the current foreground application is not a target application. For example, if the previous foreground application was a target application but the current foreground application is not a target application, performance enhancing solution 130 may adjust (or revert) a previous allocation of system resources 110 that was intended to enhance the performance of the previous foreground application. In some embodiments, performance enhancing solution 130 may also be configured to dynamically enhance the performance of a target application even when the target application is not the foreground application.

In short, performance enhancing solution 130 can dynamically adjust the allocation of system resources 110 in response to a change in the foreground application and/or in response to identifying that a target application is running. The primary purpose of such adjustments is to ensure that the performance of the target application, particularly when the target application is the foreground application, will be enhanced. When and how performance enhancing solution 130 will make such adjustments can be controlled by one or more policies.

Performance enhancing solution 130 may identify an applicable policy in various different ways. For example, a policy may be specific to a current user of computing device 100, to a particular position or role of the current user, to the particular type of computing device 100, to a particular hardware and/or software configuration of computing device 100, to a particular time of day, day of the week or other time-based criteria, etc. The content of a policy may also vary or may be defined in various different ways. For example, the policy may identify specific applications that should be treated as target applications (e.g., a list of applications selected by the user, an administrator or other individual), may specify criteria by which performance enhancing solution 130 should identify applications that should be treated as target applications (e.g., the ten most used applications which could be determined at one particular time or repeatedly), may specify whether the foreground application should always be treated as a target application, etc. As another example, the policy may define specific types and/or amounts of adjustments that should be made to system resources 110 when a target application is the foreground application, how adjustments, whether or not specifically defined in the policy, should be made to running applications (e.g., whether to apply adjustments to background applications, the foreground application or both, and/or whether to apply adjustments selectively to target and/or non-target applications), whether and/or how adjustments should be made when the foreground application is a target application as opposed to a non-target application, etc.

Figure 3A:
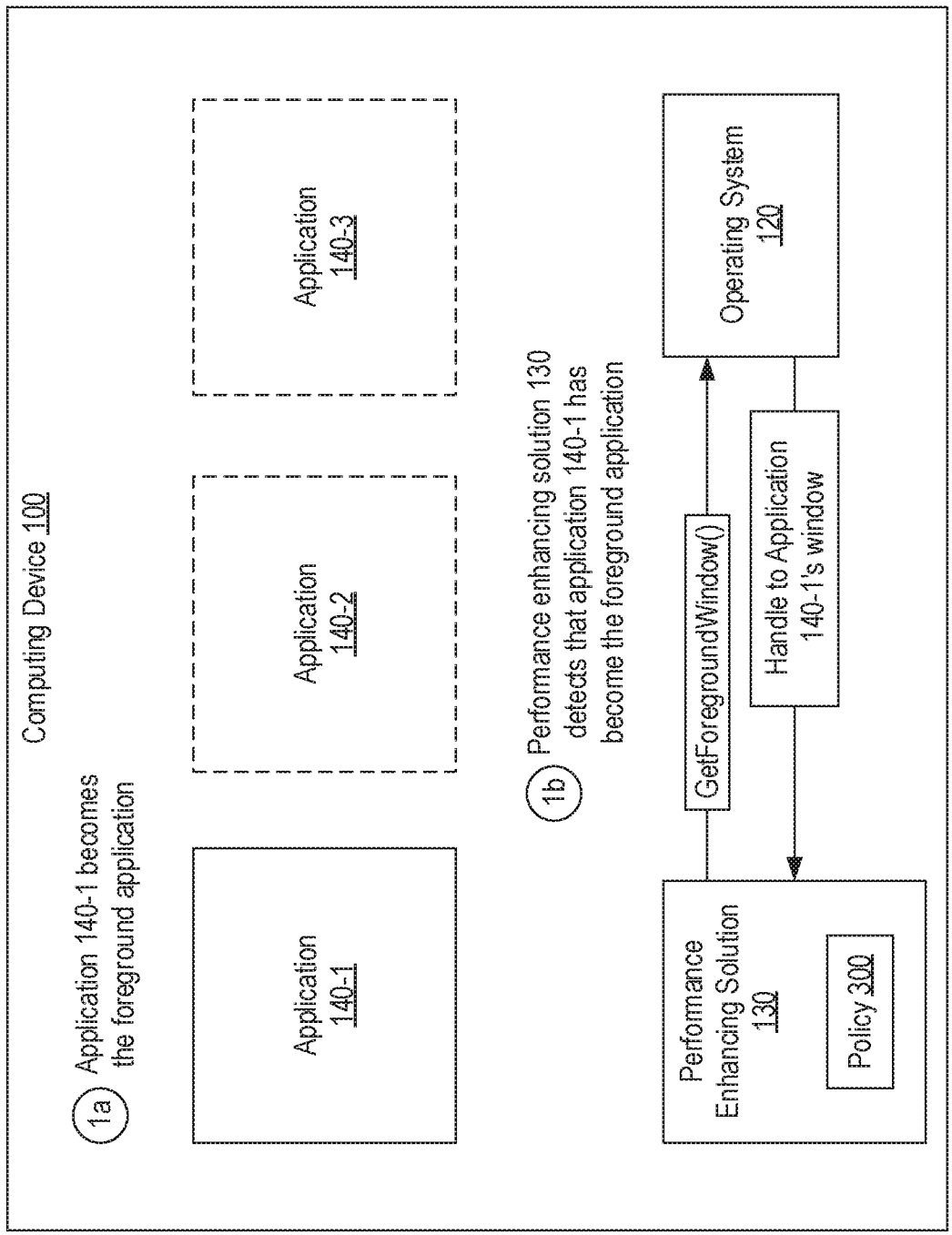
FIGS. 3A-3C provide an example of how a performance enhancing solution may adjust an allocation of system resources to enhance the performance of a foreground application.
Figure 3B:
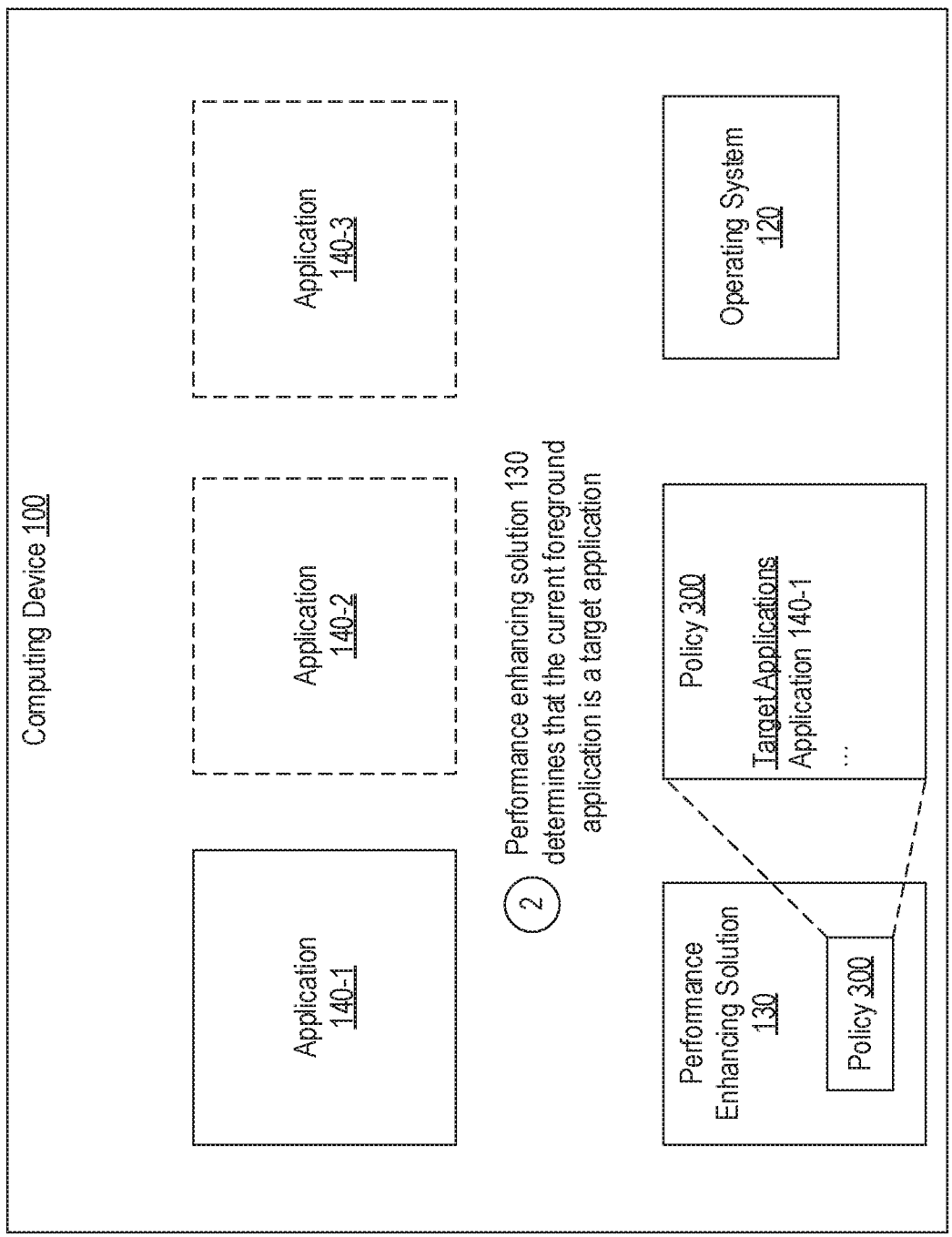
Figure 3C:
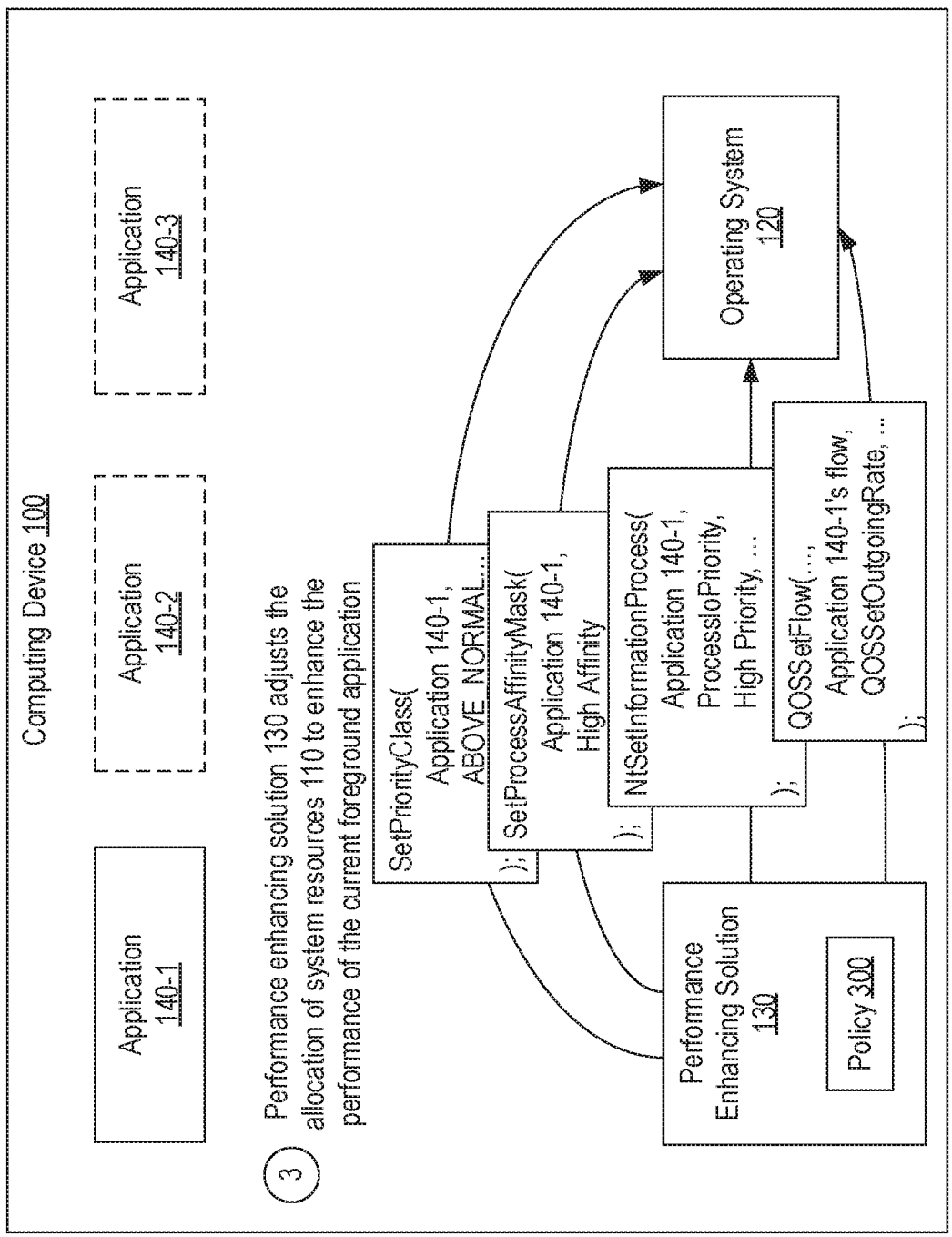

FIGS. 3A-3C provide an example of how performance enhancing solution 130 may dynamically enhance the performance of a foreground application. This example is intended to represent one of many different implementations that could be accomplished in accordance with embodiments of the present invention.

Turning to FIG. 3A, it is assumed that applications 140-1 through 140-3 are running concurrently and that, in step 1a, application 140-1 becomes the foreground application (as represented by the solid lines) while applications 140-2 and 140-3 are running in the background (as represented by the dashed lines). How application 140-1 becomes the foreground application is not essential to the present invention. For example, application 140-1 could become the foreground application in response to the user launching the application, attempting to open a document associated with the application, clicking on or otherwise selecting the application's window to give it focus, etc. It is also assumed that performance enhancing solution 130 has identified a policy 300 that is currently applicable.

In step 1b, performance enhancing solution 130 detects that application 140-1 has become the foreground application. As one Windows-specific example only, FIG. 3A represents that performance enhancing solution 130 could perform this detection by periodically calling the GetForegroundWindow( ) function which returns a handle to the window in the foreground. Although not shown, performance enhancing solution 130 could employ this handle to retrieve a process ID or some other identifier associated with the foreground window that could be used to identify application 140-1 as the owner of the window. Alternatively, as mentioned above, performance enhancing solution 130 could call one or more functions to directly obtain the process ID, thread ID or other identifier associated with the window in the foreground.

Using the process ID, thread ID or some other identifier (e.g., the process name), and possibly other information that performance enhancing solution 130 has maintained to identify the previously current foreground application (e.g., a process name or process ID of the application that had been the foreground application up until this point), performance enhancing solution 130 could then determine that application 140-1 has become the foreground application (i.e., that the foreground application has changed and that application 140-1 is the current foreground application). In short, there are many techniques that performance enhancing solution 130 could employ to determine which application owns the window that is in the foreground and to determine when the application that owns the window in the foreground has changed.

Turning to FIG. 3B, after determining that the foreground application has changed and identifying the current foreground application as application 140-1 (e.g., based on its process ID, process name or any other suitable identifier), in step 2, performance enhancing solution 130 can determine whether the current foreground application is a target application. For example, it is assumed that policy 300 provides a list of target applications that includes application 140-1. As described above, this list could have been specified by a user, created by performance enhancing solution 130 based on some criteria or otherwise populated. Accordingly, in this example, performance enhancing solution 130 could determine that application 140-1, the current foreground application, is a target application by determining that an identifier of target application 140-1 is included in the list of target applications in policy 300. As suggested above, a primary purpose for step 2 is to determine when the performance of the current foreground application should be enhanced (i.e., to selectively enhance the performance of the foreground application only when it is a target application). Therefore, in embodiments where performance enhancing solution 130 always enhances the performance of the foreground application, step 2 may not be necessary. A number of variations of step 2 could equally be performed. For example, policy 300 may provide a list of non-target applications, in which case step 2 may entail determining that application 140-1 is not included in the list of non-target applications.

Turning to FIG. 3C, in step 3, and based on the determination that application 140-1 is a target application (or that the performance of application 140-1 should otherwise be enhanced), performance enhancing solution 130 can interface with operating system 120 to adjust the allocation of system resources 110 to applications 140-1 through 140-3. Notably, to accomplish this adjustment, performance enhancing solution 130 need not necessarily adjust the allocation of system resources 110 for each of applications 140-1 through 140-3, but may adjust the allocation of system resources 110 in a manner that will enhance the performance of the foreground application.

FIG. 3C provides a Windows-specific example in which performance enhancing solution 130 adjusts the allocation of system resources 110 to enhance the performance of application 140-1, the current foreground application, by only increasing the allocation of system resources 110 to application 140-1. In particular, performance enhancing solution 130 is shown as employing the SetPriorityClass function to set the priority class for application 140-1 to a higher level (e.g., ABOVE_NORMAL_PRIORITY_CLASS). The Windows operating system employs the priority class of each process (or thread) to determine which process will obtain the next slice of the CPU time. Accordingly, by setting the priority class of application 140-1's process to a high level, application 140-1 will likely obtain more frequent slices of CPU time.

Performance enhancing solution 130 is also shown as employing the SetProcessAffinityMask function to set the processor affinity mask for the threads of application 140-1's process to a higher level. Setting the processor affinity mask to a higher level may allow application 140-1's threads to run on each available processor or at least a greater number of the available processors on computing device 100.

Performance enhancing solution 130 is also shown as employing the NtSetInformationProcess function to set the ProcessIoPriority class to a higher level. Setting the ProcessIoPriority class to a higher level may allow application 140-1's I/O to be handled at a higher priority. Performance enhancing solution 130 is also shown as employing the QOSSetFlow function to prioritize application 140-1's network packets such as, for example, to meet a required service level agreement of application 140-1.

Although FIG. 3C uses four Windows-specific functions as examples, it is reiterated that performance enhancing solution 130 could employ similar or equivalent functions available within the Windows operating system or any other operating system to accomplish the same or similar type of adjustments to the allocation of system resources 110. Accordingly, step 3 may encompass any functionality that performance enhancing solution 130 may perform to increase the availability of system resources 110 for the current foreground application including, but not limited to, increasing the priority class, the process affinity, the I/O priority and QoS of the current foreground application.

In some embodiments, in addition to or in place of increasing the allocation of system resources 110 to the current foreground application, performance enhancing solution 130 may also reduce the allocation of system resources 110 to one or more background applications. For example, in step 3, performance enhancing solution 130 may also employ the SetPriorityClass function, the SetProcessAffinityMask function, the ProcessIoPriority class and the QOSSetFlow function to reduce the priority class, process affinity, I/O priority and QoS respectively of applications 140-2 and 140-3. In such cases, the reduction in the allocation of system resources 110 to applications 140-2 and 140-3 may ensure that the increase in the allocation of system resources 110 to application 140-1 results in a performance enhancement. Alternatively, performance enhancing solution 130 may only reduce the allocation of system resources 110 to background applications to cause the performance of the current foreground application to be increased. In short, the increase in performance can be accomplished by any adjustment in the allocation of system resources 110 that causes the allocation of system resources 110 to the current foreground application to be increased relative to the allocation of system resources 110 to one or more concurrently running applications.

In some embodiments, performance enhancing solution 130 may base its adjustments in the allocation of system resources 110 on current consumption of system resources 110. For example, if consumption of system resources 110 is high at the time when performance enhancing solution 130 performs step 3, it may choose to decrease the allocation of system resources 110 to each background application in addition to increasing the allocation of system resources 110 to the current foreground application. In contrast, if the consumption of system resources 110 is low, performance enhancing solution 130 may choose only to increase the allocation of system resources 110 to the current foreground application. In some embodiments, such decisions may be based on policy 300.

In some embodiments, performance enhancing solution 130 may employ policy 300 to determine which background applications should have their allocation of system resources 110 reduced. For example, policy 300 may dictate that the allocation of system resources 110 to a target application that is running in the background should not be reduced while the allocation of system resources 110 to a non-target application that is running in the background should be reduced. Similarly, policy 300 may dictate that the allocation of system resources 110 to a target application that is running in the background should be reduced to a lesser extent relative to the reduction in the allocation of system resources 110 to a non-target application that is running in the background.

Returning to the example in FIGS. 3A-3C, at some point, application 140-1 will no longer be the foreground application, and performance enhancing solution 130 can repeat the above-described process. For example, if application 140-2 becomes the foreground application, performance enhancing solution 130 may again perform step 2 and step 3 as appropriate. In such a case, and assuming application 140-2 is a target application, performance enhancing solution 130 may perform step 3 in a similar manner as described above. However, if application 140-2 is not a target application, performance enhancing solution 130 may not adjust the allocation of system resources 110 to increase the performance of application 140-2, but may rather undo the previous adjustments it had made to increase the performance of application 140-1. In other words, when a non-target application is the foreground application, performance enhancing solution 130 may cause the allocation of system resources 110 to return to a default state.

However, in some embodiments, performance enhancing solution 130 may retain previous adjustments in the allocation of system resources 110 that were made to enhance the performance of an application that is no longer the foreground application. For example, after application 140-1 is no longer the foreground application, performance enhancing solution 130 may retain the adjustments it made in step 3 until a target application becomes the foreground application. Similarly, if a non-target application becomes the foreground application and that non-target application previously had its allocation of system resources 110 reduced, performance enhancing solution 130 may retain the reduction even though the non-target application is the foreground application. In some embodiments, all such variations could be controlled using policy.

By using the above-described techniques, performance enhancing solution 130 can increase the performance of a foreground application in a dynamic/real-time manner. For example, in some embodiments, performance enhancing solution 130 could repeatedly monitor for the ten most used applications and treat those ten most used applications as target applications. In this way, performance enhancing solution 130 may always increase the performance of the applications with which the user most frequently interacts.

The above-described techniques may also provide performance enhancements without sacrificing battery life or otherwise unduly increasing power consumption. For example, in comparison to changing the power mode for the entire system which would quickly drain a battery, performance enhancing solution 130 can target the increase in performance to only the target applications while they are the foreground application. Additionally, in some cases, the increased power utilization that may result from a temporary increase in the allocation of system resources to the foreground application may be offset by the decreased power utilization that results from the temporary (or permanent) decrease in the allocation of system resources to the background applications.

In summary, a performance enhancing solution can be employed on a wide variety of computing devices to dynamically enhance the performance of an application while it is the foreground application. Such enhancements can be obtained by either or both increasing system resources available to the foreground application or limiting system resources available to background applications. Such enhancements may also be provided to a select set of target applications which may be manually defined or dynamically selected.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically enhancing the performance of a foreground application, the method comprising:
   detecting that a first application of a plurality of running applications has become the foreground application;
   in response to detecting that the first application has become the foreground application, determining whether the first application is included in a list of target applications; and
   in response to determining that the first application is included in the list of target applications, adjusting an allocation of system resources to the plurality of running applications to enhance performance of the first application while the first application is the foreground application including one or more of:
      adjusting a priority at which one or more of the plurality of running applications are selected for slices of CPU time;
      adjusting a processor affinity of one or more of the plurality of running applications; or
      adjusting an I/O priority of one or more of the plurality of running applications.

2. The method of claim 1, wherein detecting that the first application has become the foreground application comprises determining that another application that is also included in the list of target applications is no longer the foreground application.

3. The method of claim 1, wherein detecting that the first application has become the foreground application comprises determining that a window that has focus is owned by the first application.

4. The method of claim 1, wherein adjusting the allocation of system resources to the plurality of running applications to enhance the performance of the first application while the first application is the foreground application comprises:
   increasing the allocation of system resources to the first application.

5. The method of claim 4, wherein adjusting the allocation of system resources to the plurality of running applications to enhance the performance of the first application while the first application is the foreground application further comprises:
   decreasing the allocation of system resources to one or more other applications of the plurality of running applications.

6. The method of claim 1, wherein adjusting the allocation of system resources to the plurality of running applications to enhance the performance of the first application while the first application is the foreground application comprises:
   decreasing the allocation of system resources to one or more other applications of the plurality of running applications.

7. The method of claim 1, wherein adjusting the allocation of system resources to the plurality of running applications to enhance the performance of the first application while the first application is the foreground application comprises two or more of:
   adjusting a priority at which one or more of the plurality of running applications are selected for slices of CPU time;
   adjusting a processor affinity of one or more of the plurality of running applications; or
   adjusting an I/O priority of one or more of the plurality of running applications.

8. The method of claim 1, wherein the allocation of system resources is adjusted based on one or more policies.

9. The method of claim 1, wherein determining whether the first application is included in the list of target applications comprises accessing a policy.

10. The method of claim 9, further comprising:
    identifying a plurality of most used applications; and
    modifying the policy to include the most used applications in the list of target applications.

11. The method of claim 1, further comprising:
    detecting that the first application is no longer the foreground application; and
    adjusting the allocation of system resources to the plurality of running applications to no longer enhance the performance of the first application.

12. The method of claim 11, wherein detecting that the first application is no longer the foreground application comprises detecting that a second application of the plurality of running applications is the foreground application and is included in the list of target applications; and wherein adjusting the allocation of system resources to the plurality of running applications to no longer enhance the performance of the first application comprises adjusting the allocation of system resources to the plurality of running applications to enhance the performance of the second application while the second application is the foreground application.

13. The method of claim 1, further comprising:
detecting that a second application of the plurality of running applications is included in the list of target applications; and
in response to determining that the second application is included in the list of target applications, adjusting an allocation of system resources to the plurality of running applications to enhance performance of the second application when the second application is not the foreground application.

14. One or more computer storage media storing computer executable instructions which when executed on a computing device implement a method for dynamically enhancing the performance of a foreground application, the method comprising:
monitoring for changes in the foreground application;
upon detecting that the foreground application has changed, determining that the foreground application is included in a list of target applications; and
in response to determining that the foreground application is included in the list of target applications, adjusting an allocation of system resources to a plurality of running applications to enhance performance of the foreground application including one or more of:
adjusting a priority at which one or more of the plurality of running applications are selected for slices of CPU time;
adjusting a processor affinity of one or more of the plurality of running applications; or
adjusting an I/O priority of one or more of the plurality of running applications.

15. The computer storage media of claim 14, wherein determining that the foreground application is included in the list of target applications comprises accessing a policy.

16. The computer storage media of claim 14, wherein adjusting the allocation of system resources to the plurality of running applications to enhance the performance of the foreground application comprises two or more of:
adjusting a priority at which one or more of the plurality of running applications are selected for slices of CPU time;
adjusting a processor affinity of one or more of the plurality of running applications; or
adjusting an I/O priority of one or more of the plurality of running applications.

17. The computer storage media of claim 14, wherein adjusting the allocation of system resources to the plurality of running applications to enhance the performance of the foreground application comprises one or both of:
increasing an allocation of system resources to the foreground application; or
decreasing an allocation of system resources to one or more other applications of the plurality of running applications.

18. A computing device comprising:
system resources including one or more processors;
an operating system;
a performance enhancing solution; and
a plurality of running applications;
wherein the performance enhancing solution is configured to:
detect that a first application of the plurality of applications has become a foreground application;
in response to detecting that the first application has become the foreground application, determine whether the first application is included in a list of target applications; and
in response to determining that the first application is included in the list of target applications, adjust an allocation of the system resources to the plurality of running applications to enhance performance of the first application while the first application is the foreground application;
wherein detecting that the first application has become the foreground application comprises determining that another application that is also included in the list of target applications is no longer the foreground application.

19. The computing device of claim 18, wherein adjusting the allocation of system resources to the plurality of running applications to enhance the performance of the first application while the first application is the foreground application comprises one or more of:
adjusting a priority at which one or more of the plurality of running applications are selected for slices of CPU time;
adjusting a processor affinity of one or more of the plurality of running applications; or
adjusting an I/O priority of one or more of the plurality of running applications.

20. The computing device of claim 18, wherein adjusting the allocation of the system resources to the plurality of running applications comprises one or both of:
increasing an allocation of system resources to the first application when the first application is the foreground application; or
decreasing an allocation of system resources to one or more other applications of the plurality of running applications when the first application is the foreground application.

* * * * *